(12) United States Patent
Cha

(10) Patent No.: US 6,831,814 B2
(45) Date of Patent: *Dec. 14, 2004

(54) FLEXURE DESIGN PROVIDING IMPROVED LIFT-OFF IN A DISK DRIVE

(75) Inventor: Ellis T. Cha, San Jose, CA (US)

(73) Assignee: SAE Magnetics (H.K.) Ltd., Kwai Chung (HK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,472

(22) Filed: Jul. 24, 1998

(65) Prior Publication Data

US 2001/0022709 A1 Sep. 20, 2001

(51) Int. Cl.$^7$ .............................................. G11B 21/16
(52) U.S. Cl. ................................................... 360/245.3
(58) Field of Search ................................ 360/104, 245, 360/245.1, 245.2, 245.3, 245.4, 245.5, 245.6

(56) References Cited

U.S. PATENT DOCUMENTS

| | | | | | |
|---|---|---|---|---|---|
| 4,280,156 A | * | 7/1981 | Villette | .................... | 360/255.6 |
| 4,399,476 A | * | 8/1983 | King | .................... | 360/245.1 |
| 4,616,279 A | * | 10/1986 | Poorman | .................... | 360/103 |
| 4,896,233 A | * | 1/1990 | Yamada | .................... | 360/104 |
| 4,922,356 A | * | 5/1990 | Yamaguchi et al. | ........ | 360/104 |
| 5,115,363 A | * | 5/1992 | Khan et al. | .................. | 360/104 |
| 5,530,605 A | * | 6/1996 | Hamaguchi et al. | ........ | 360/104 |
| 5,617,274 A | * | 4/1997 | Ruiz | .................... | 360/104 |
| 5,630,948 A | * | 5/1997 | Ueda et al. | .................. | 216/20 |
| 5,659,448 A | * | 8/1997 | Shimizu et al. | ............. | 360/104 |
| 6,115,221 A | * | 9/2000 | Utsunomiya | ............. | 360/245.1 |

FOREIGN PATENT DOCUMENTS

JP              9-147510           * 6/1997

* cited by examiner

Primary Examiner—David Davis
(74) Attorney, Agent, or Firm—Kenyon & Kenyon

(57) ABSTRACT

A flexure design is provided that can focus the lifting force on a slider device at its leading edge. For sub-ambient pressure sliders, this results in an rapid increase in pressure in the sub-ambient pressure area causing the slider device to quickly lift off from the disk surface in a ramp unload disk drive. In one embodiment, first and second outriggers are provided in the flexure that each include a section that extends distally and a section that extends proximally. The sections of the outriggers that extend proximally can be joined and coupled to a tab section slider which would be located at the leading edge of the slider.

19 Claims, 7 Drawing Sheets

FLEXURE DESIGN PROVIDING IMPROVED LIFT-OFF IN A DISK DRIVE

FIELD OF THE INVENTION

The present invention is directed to flexure designs in disk drives. More particularly, the present invention provides a flexure design that can be used advantageously in a ramp load/unload disk drive using a sub-ambient slider device.

BACKGROUND OF THE INVENTION

Disk drives are commonly used in workstations, personal computers, laptops and other computer systems to store large amounts of data in a form that can be made readily available to a user. In general, a disk drive comprises a magnetic disk that is rotated by a spindle motor. The surface of the disk is divided into a series of data tracks. The data tracks are spaced radially from one another across a band having an inner diameter and an outer diameter.

Each of the data tracks extends generally circumferentially around the disk and can store data in the form of magnetic transitions within the radial extent of the track on the disk surface. An interactive element, such as a magnetic transducer, is used to sense the magnetic transitions to read data, or to transmit an electric signal that causes a magnetic transition on the disk surface, to write data. The magnetic transducer includes a read/write gap that contains the active elements of the transducer at a position suitable for interaction with the magnetic surface of the disk. The radial dimension of the gap fits within the radial extent of the data track containing the transitions so that only transitions of the single track are transduced by the interactive element when the interactive element is properly centered over the respective data track.

As known in the art, the magnetic transducer is mounted by a head structure to a rotary actuator arm and load beam and is selectively positioned by the actuator arm over a preselected data track of the disk to either read data from or write data to the preselected data track of the disk, as the disk rotates below the transducer. The actuator arm is, in turn, mounted to a voice coil motor that can be controlled to move the actuator arm across the disk surface.

The head structure also includes a slider having an air bearing surface that causes the transducer to fly above the data tracks of the disk surface due to fluid currents caused by rotation of the disk. Thus, the transducer does not physically contact the disk surface during normal operation of the disk drive to minimize wear at both the head and disk surface. The amount of distance that the transducer flies above the disk surface is referred to as the "fly height." It is a design goal to maintain the fly height of the head at an even level regardless of the radial position of the head.

The magnetic transducer typically resides at the trailing edge of the slider body. In a contact start stop (CSS) operation, the slider rests on the surface of the disk when the disk is not spinning and momentarily slides upon the surface of the disk as the disk spins up until the slider eventually flies above the surface of the disk. When the disk stops spinning, the slider once again rests on the surface of the disk. Several problems are seen with CSS systems. First, the slider contact with the disk can cause damage to the slider, the disk, or both. Also, there may exist "starting friction" (also known as "stiction") between the slider and the disk, which may also cause damage to the slider, the disk, or both.

One solution in the art is ramp loading/unloading. In this procedure, it is intended that the slider never rest upon the disk. Instead, when no reading or writing operation is needed, the load beam (to which the slider is connected via a flexure) is rotated away from the recordable area of the disk to a point where it will contact the lower portion of an inclined ramp. The load beam is further rotated so that it will move up the incline of the ramp and away from the surface of the disk. As the load beam is moved away from the disk, the flexure as well as the slider are likewise urged away from the spinning disk.

Ramp unloading may have a negative affect on the flexure, especially when a so-called "negative-pressure" or "sub-ambient" slider is being used. An example of a known negative pressure slider is shown in FIG. 1. The side of the slider which faces the disk includes at least first and second rails 10 and 12 with a cross beam 14 or similar structure connecting the rails at the leading edge of the slider. The air flow resulting from the spinning disk passes over the leading edge of the slider and the cross beam 14 and will cause an area of negative pressure (i.e., pressure less than 1 atmosphere) in an area 16 between the first and second rails 10 and 12 and cross beam 14. This negative pressure causes the slider to fly lower to the spinning disk which allows for a higher recording density and larger disk capacity.

Referring to FIG. 2, a flexure that is known in the art is shown. Flexure 50 includes a main body 51 having a near end 52. First and second "outriggers" 53a and 53b are provided which connect at a distal end 54 of the flexure. A tab 55 is provided, extending from the distal end 54 of the flexure 50 via a neck portion 56. The slider (e.g., the slider of FIG. 1) is attached to the tab 55 of the flexure 50 so that the leading edge of the slider faces the near end 52 of the flexure and the trailing edge of the slider faces the distal end 54 of the flexure.

Referring to FIG. 3, a side view of the flexure 50 is shown attached to a load beam 60 and slider 65 is attached to the tab portion of flexure 50. In this example a bubble 67 is provided on the side of the slider facing away from the disk surface. The bubble 67, outriggers 53a, 53b, tab 55 and neck portion 56 contribute to allowing the slider 65 to pitch and roll relative to the moving disk 68. As shown in FIG. 3, the leading edge of the slider 65 pitches up slightly contributing to the slider's ability to fly over the moving disk. When using this flexure in a ramp load/unload drive, the movement of the load beam away from the disk surface will cause the flexure to move away from the moving disk surface as well. As the flexure moves away from the disk surface, it pulls on the slider 65 at its trailing edge (as indicated by the upward pointing arrow). This causes the slider to pitch forward. The negative pressure area of the slider, however, is maintained. Accordingly, as the load beam continues to move up the ramp and away from the disk surface, the slider maintains its negative pressure attraction to the moving disk surface (as indicated by the downward pointing arrow) causing the flexure to bend, as shown in FIG. 3. The flexure will continue to stretch and bend until the slider is eventually pulled away from the disk surface. This stretching can cause the flexure to mechanically deform which can have deleterious effects on the flexure and its ability to control the pitch and roll of the slider.

In view of the above, there is a need for an improved flexure design that avoids these problems.

DETAILED DESCRIPTION

Figure 4:
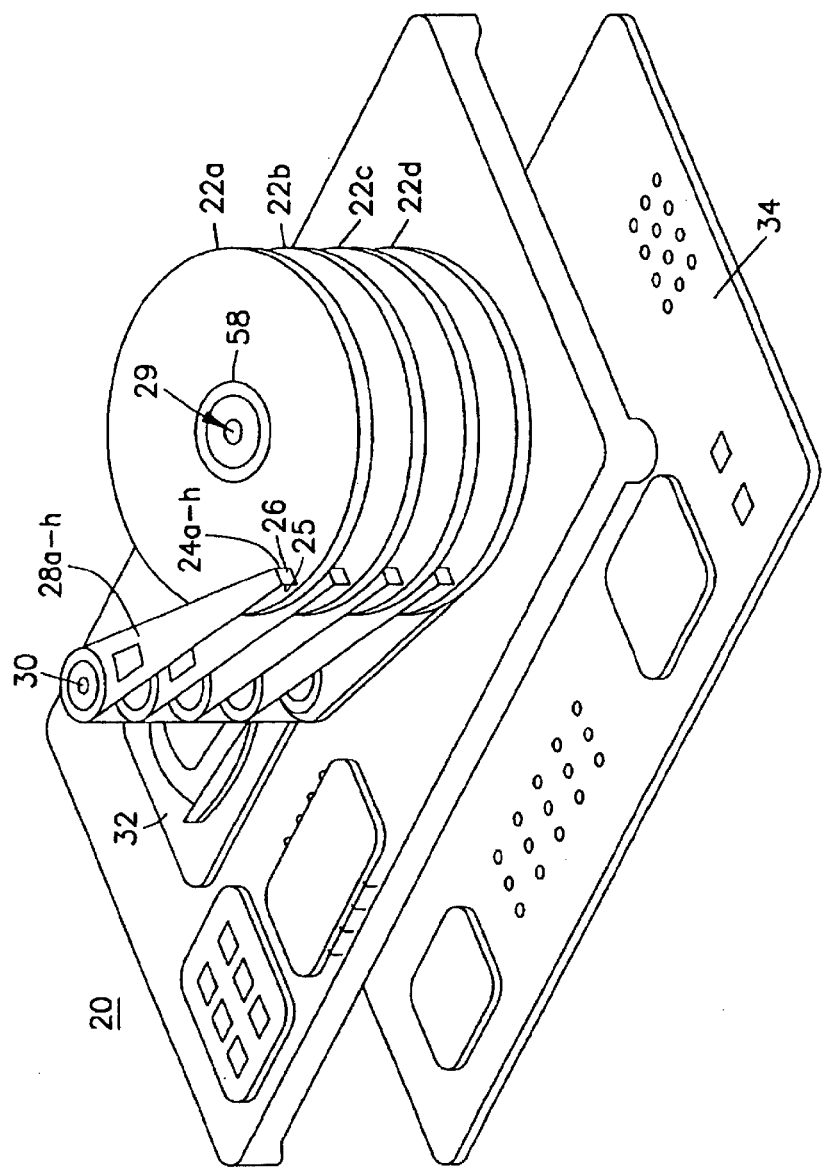
FIG. 4 is perspective view of an exemplary disk drive.

Referring now to the drawings, and initially to FIG. 4, there is illustrated an example of a disk drive designated generally by the reference numeral 20. The disk drive 20 includes a stack of storage disks 22a–d and a stack of read/write heads 24a–h. Each of the storage disks 22a–d is provided with a plurality of data tracks to store user data. As illustrated in FIG. 4, one head is provided for each surface of each of the disks 22a–d such that data can be read from or written to the data tracks of all of the storage disks. The heads are coupled to a pre-amplifier 31. It should be understood that the disk drive 20 is merely representative of a disk drive system utilizing the present invention and that the present invention can be implemented in a disk drive system including more or less storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disk surfaces.

Each of the read/write heads 24a–h is mounted to a respective actuator arm 28a–h by a flexure element (e.g., a flexure according to the present invention shown in FIG. 7) and comprises a magnetic transducer 25 mounted to a slider 26 having an air bearing surface (not shown), all in a known manner. As typically utilized in disk drive systems, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h to a ramp, and a load beam of. the actuator arms 28a–h moves up the load beam to a resting position away from the storage disk surfaces.

A printed circuit board (PCB) 34 is provided to mount control electronics for controlled operation of the spindle motor 29 and the voice coil motor 32. The PCB 34 also includes read/write channel circuitry coupled to the read/write heads 24a–h via the pre-amplifier 31, to control the transfer of data to and from the data tracks of the storage disks 22a–d. The manner for coupling the PCB 34 to the various components of the disk drive is well known in the art, and includes a connector 33 to couple the read/write channel circuitry to the pre-amplifier 31.

During a read operation, electrical signals transduced by the head from the magnetic transitions of data sectors on the disk surface are input to the read channel of the read/write control 36 for processing via the pre-amplifier 31. A memory on the PCB 34 can be used to buffer data read from or to be written to the data sectors of the storage disks 22a–d via a read/write control. The buffered data can be transferred to or from a host computer utilizing the disk drive for data storage.

Figure 5:
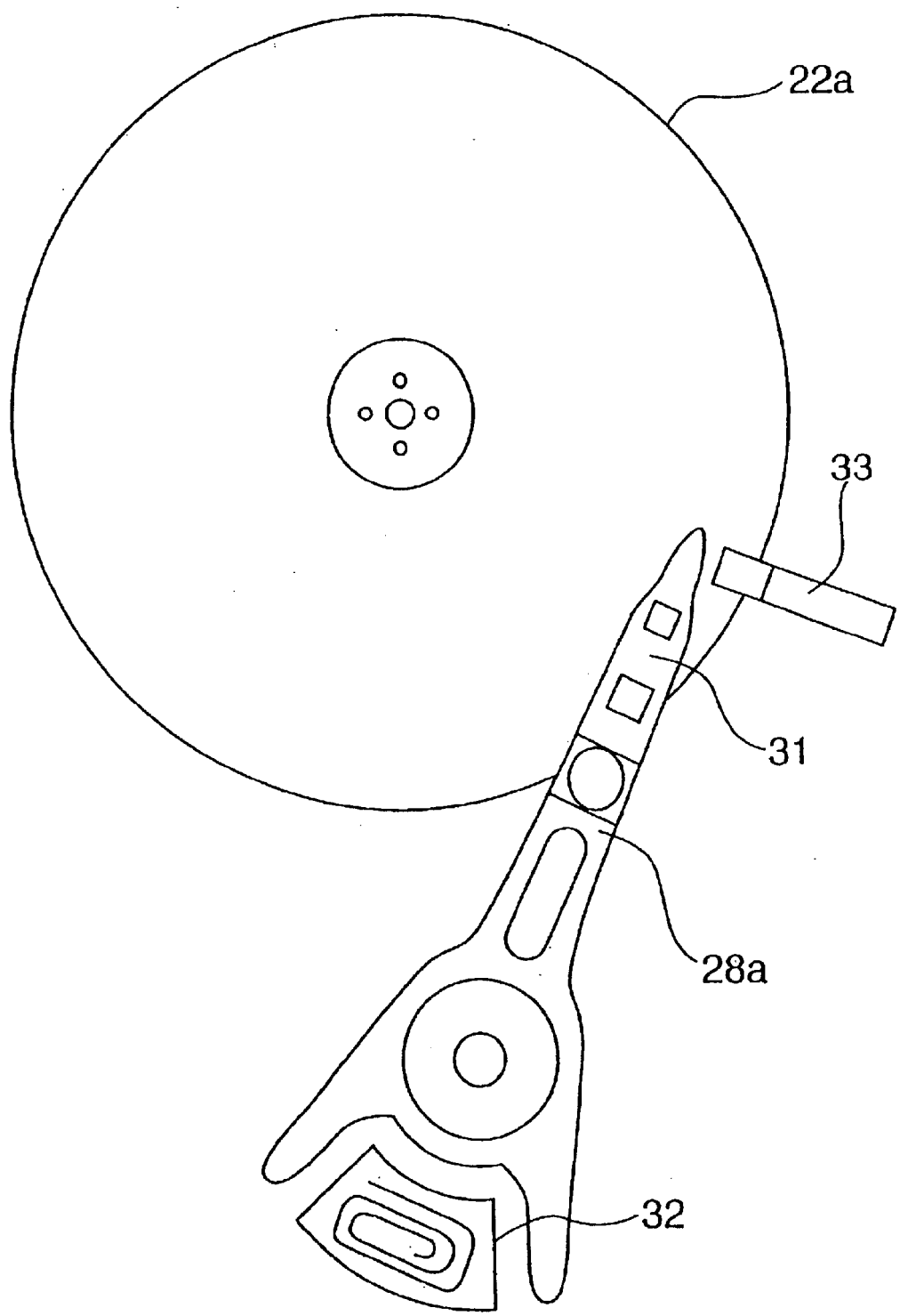
FIG. 5 is an exploded view of components of the actuator arm voice coil motor of the disk drive of FIG. 1.

Referring now to FIG. 5, there is shown an exploded view of certain conventional components of the voice coil motor 32 relevant to the present invention. An electric coil element 140 includes an opening 140a that is received over the pin 30 and arranged between two actuator arms 28, in a known manner. The electric coil element 140 includes an electric coil portion 140b that is positioned between two plates 146a,b mounted within the disk drive 20. A permanent magnet 144 is secured to one of the two mounting plates 146a,b such that the magnetic field of the permanent magnet 144 interacts with a magnetic field generated by the electric coil portion 140b upon the application of a voltage to the coil by the actuator control 40, as described above. The magnetic interaction between the coil portion 140b and the permanent magnet 144 causes movement of the electric coil element 140 to thereby rotate the pin 30 and move the actuator arms 28a–h as a function of the magnitude and direction of the applied voltage. Consequently, application of a controlled voltage can be used to position the heads 24a–h over any preselected data track.

Figure 6:
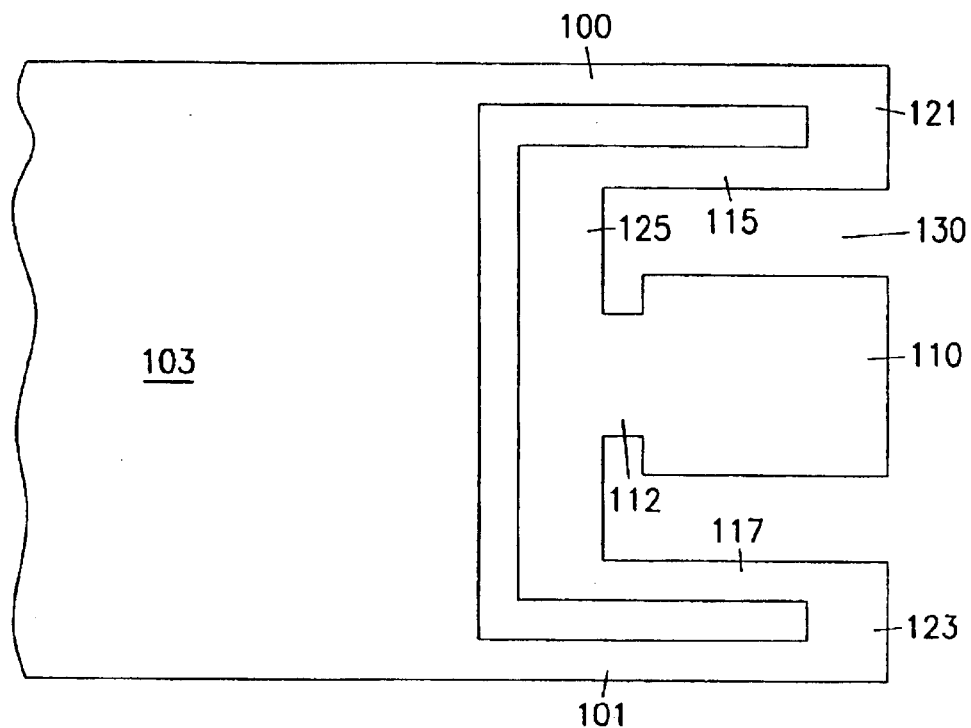
FIG. 6 is a plan view of a flexure constructed according to an embodiment of the present invention.

A top-view of a flexure design according to an embodiment of the present invention is shown in FIG. 6. The flexure body 103 includes first and second outriggers 121 and 123. In this embodiment, first outrigger 121 includes a first section 100 extending in a generally distal direction from the flexure body 103 and a second section 115 coupled to the first section and extending in a generally proximal direction. Likewise, second outrigger 123 includes a first section 101 extending in a generally distal direction from the flexure body 103 and a second section 117 coupled to the first section and extending in a generally proximal direction. The second portions 115 and 117 of the first and second outriggers connect at a proximal section 125. A tab section 110 is provided for the mounting of a slider device or the like (e.g., element 130 in FIG. 7). After it is mounted, the leading edge of the slider device (not shown in FIG. 7) is toward the proximal section of the flexure. To provide the slider device with more mobility, a neck section 112 can be provided coupled between the tab section 110 and the proximal section 125.

Figure 1:
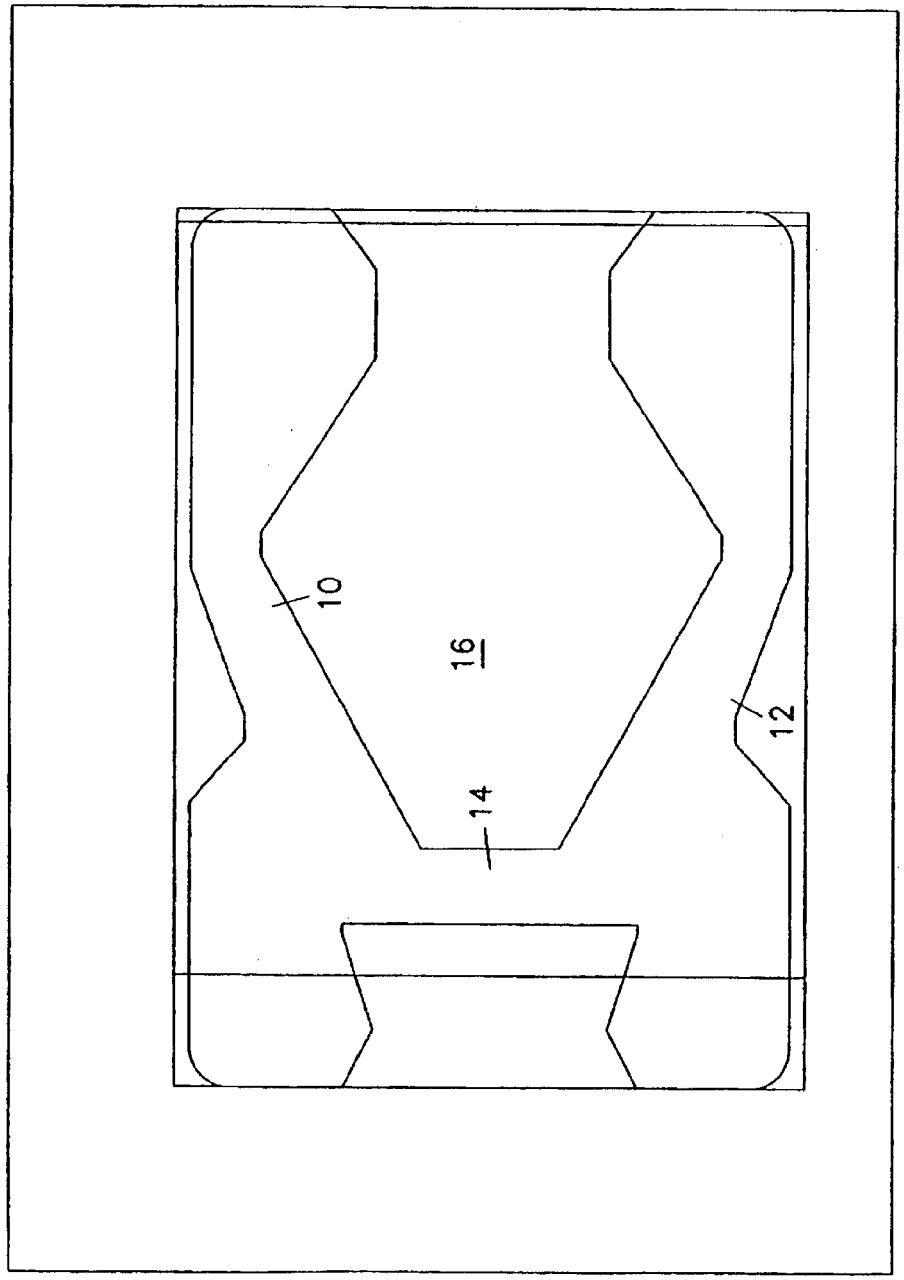
FIG. 1 is a plan view of a sub-ambient pressure slider as is known in the art.
Figure 2:
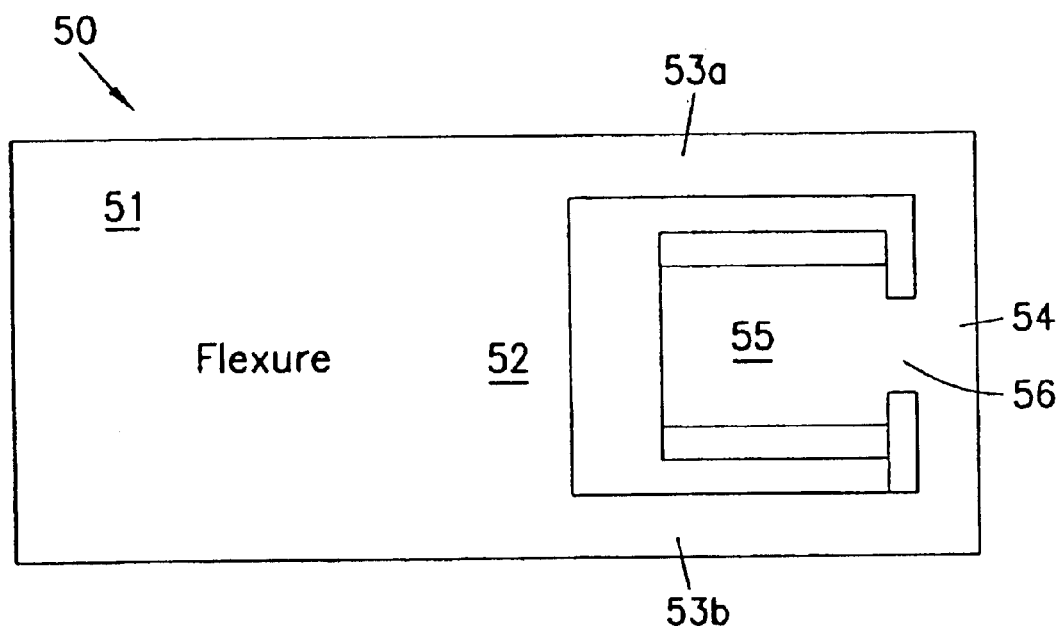
FIG. 2 is a plan view of a flexure design as known in the art.
Figures 3, 7:
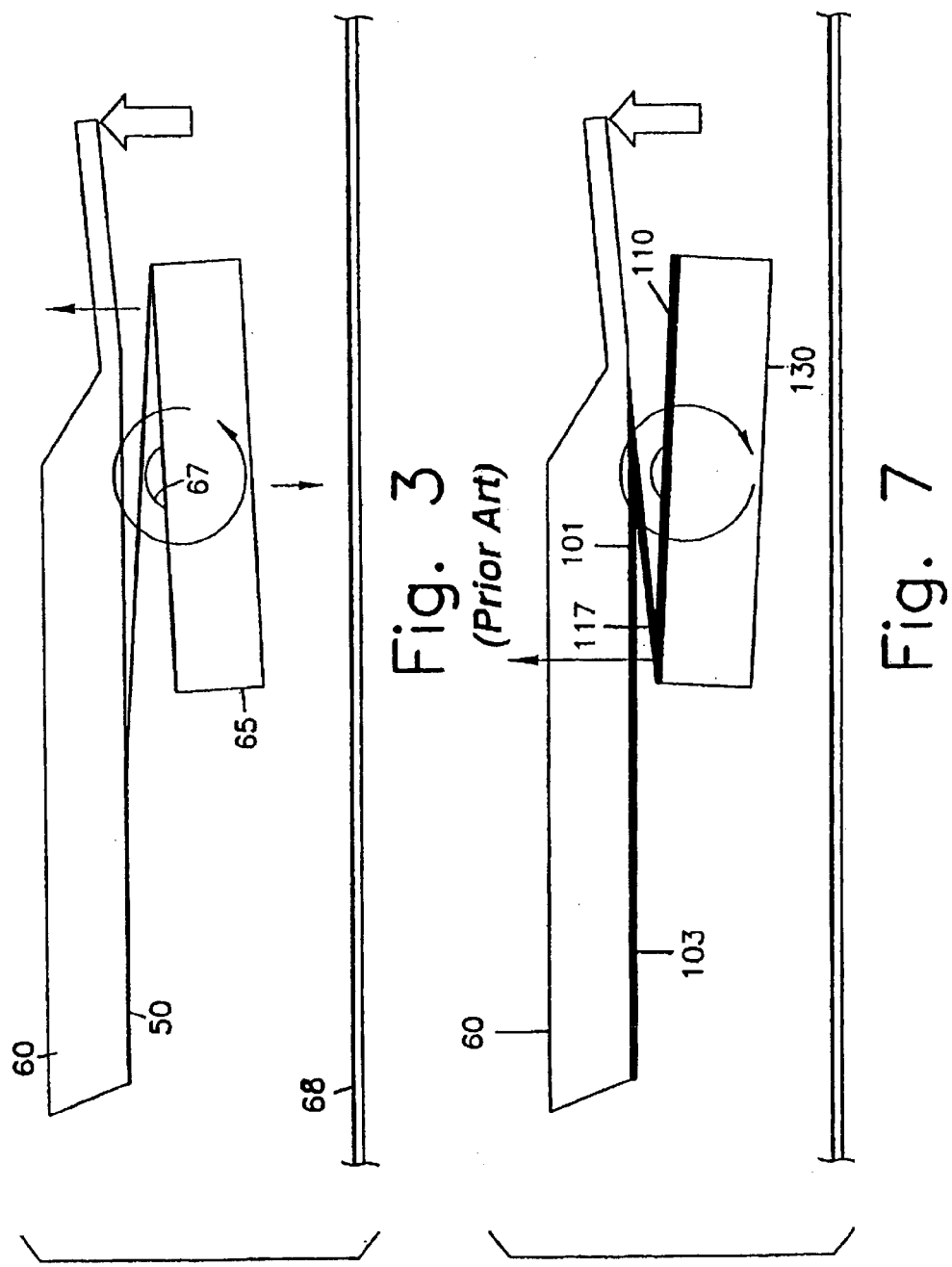
FIG. 3 is a side view of the flexure and slider of FIGS. 1 and 2.
FIG. 7 is a side view of the flexure of FIG. 6 coupled to a load beam.

In operation with the disk drive of FIG. 4, the slider device is easily lifted off and away from the moving disk surface during a ramping up operation (i.e., moving of the load beam up along the ramp). As shown in FIG. 6, when the load beam and the flexure body 103 is lifted during the ramping up operation, a force lifting the slider up from the disk is focused at the leading edge of the slider as opposed to the trailing edge of the slider. For example, in FIG. 6, the focus of the forces lifting the slider up from the disk occurs near the neck portion 112 of the flexure. A side view of the slider is shown in FIG. 7, where the focus of the lifting forces are shown with an upward pointing arrow. As the leading edge of the slider is lifted, pressurization in the sub-ambient pressure area increases. This results in less of an attraction between the slider and the moving disk. Accordingly, lifting the slider at its leading edge during the ramping up operation causes the slider to lift off from the disk surface faster than when lifting the slider at its trailing edge. The quick removal of the slider from the disk surface results in less stress upon the flexure structure.

Figure 8:
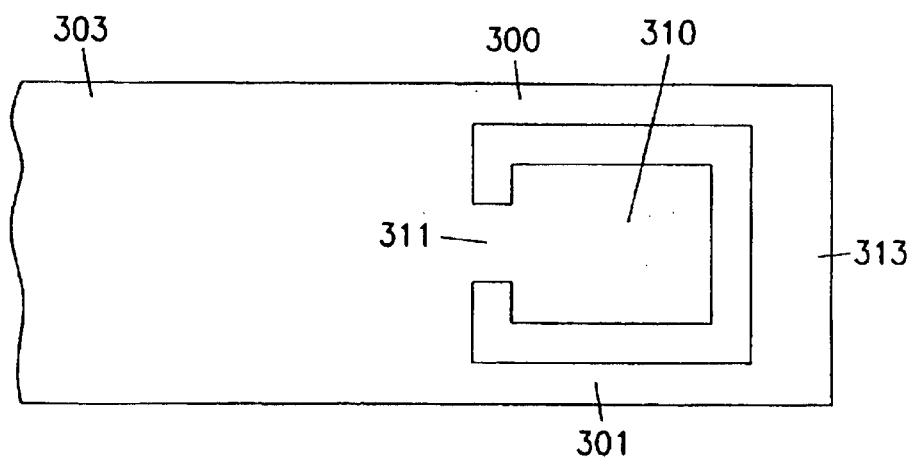
FIG. 8 is a plan view of a second embodiment of a flexure constructed according to an embodiment of the present invention.

An alternate embodiment of the present invention is shown in FIG. 8. In FIG. 8, a tab section 310 is coupled to a proximal portion of the main body 303 of the flexure via a neck section 312. If desired outriggers 300, 301 can be provided which are coupled together via a distal section 321. A drawback of the design of FIG. 8 is that a slider mounted to the tab section 310 is not as free to move (e.g., pitch and roll) as compared to the flexure design of FIG. 7. As with the flexure of FIG. 7, during a ramping-up operation, the leading edge of the slider body will be pulled upward to increase the pressure under the slider (i.e., decrease the magnitude of the sub-ambient pressure region) and cause the slider body to move quickly away from the disk surface.

Figure 9:
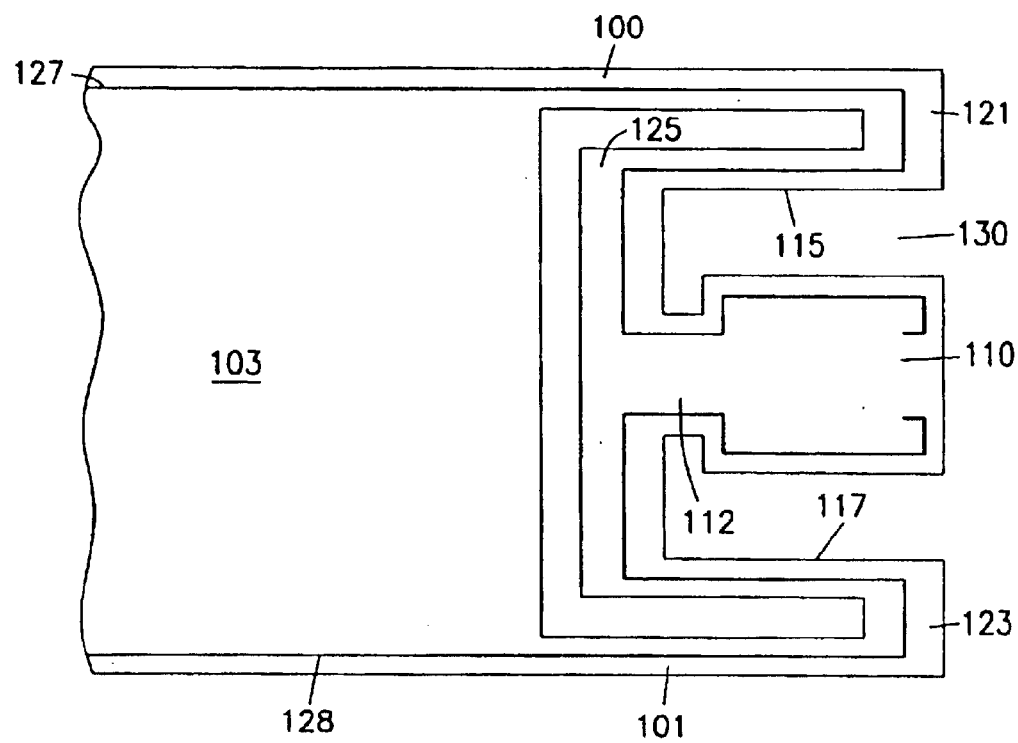
FIG. 9 is a plan view of the flexure of FIG. 6 including conductive traces.
Figure 10:
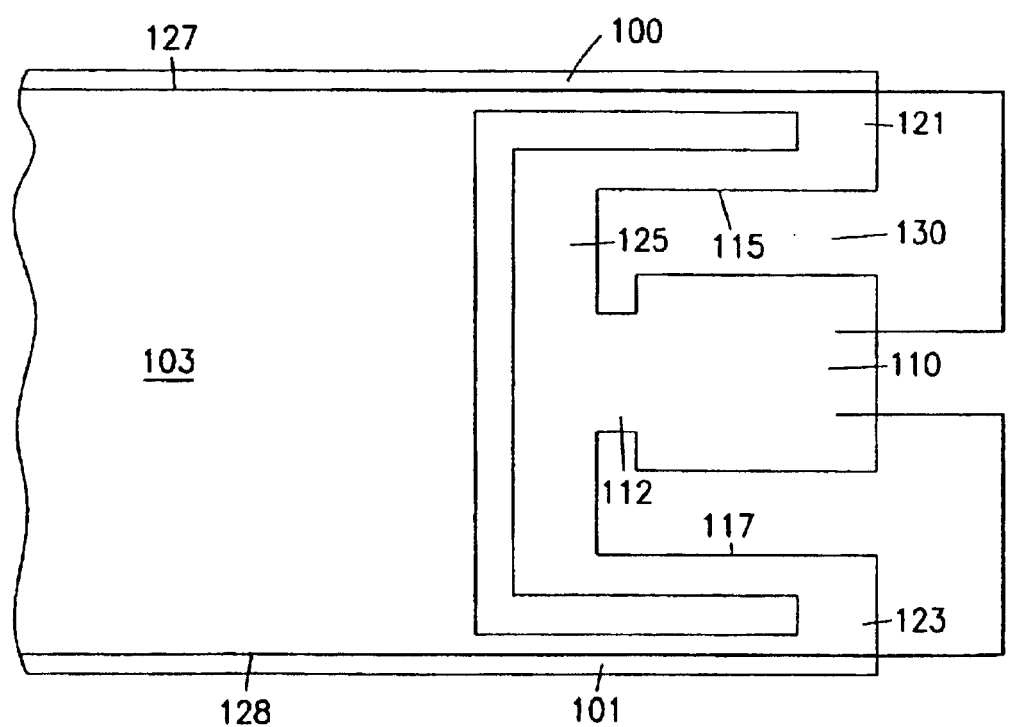
FIG. 10 is another example of the flexure of FIG. 6 with conductive traces.

Referring to FIG. 9, a further embodiment of the present invention is shown where conductive traces are provided to electrically couple the components on the PCB (see FIG. 4) to the slider attached to the flexure (e.g., element 130 in FIG. 9). In this embodiment, traces 127, 128 follow the main body 103 of the flexure and extend as part of the first and second outriggers 121, 123. Traces 127, 128 also extend over neck 112 to a distal portion of tab 110. In FIG. 10 another example of a flexure with conductive traces is shown. As shown therein, the traces extend from the distal portions of the first and second outriggers to the tab 110. The conductive traces can be attached to or made a part of the flexure structure in a known manner.

Although embodiments are specifically illustrated and described herein, it will be appreciated that modifications and variations of the present invention are covered by the above teachings and within the purview of the appended claims without departing from the spirit and intended scope of the invention.

What is claimed is:

1. A flexure comprising:
   a flexure body;
   first and second outriggers separated from each other and coupled to said flexure body, each including:
      a first section extending in a generally distal direction from said flexure body; and
      a second section coupled to said first section and extending in a proximal direction toward said flexure body;
   wherein proximal portions of the second sections of said first and second outriggers are adapted to be coupled to a slider device via a tab section so that lifting the flexure body causes a lifting force focused at a leading portion of said tab section.

2. The flexure of claim 1 further comprising:
   a proximal section coupled to a proximal end of the second sections of said first and second outriggers.

3. The flexure of claim 2 wherein the tab section is coupled to said proximal section.

4. The flexure of claim 3 wherein said tab section is adapted to be coupled the slider device.

5. The flexure of claim 3 further comprising:
   a neck section coupled between said tab section and said proximal section.

6. The flexure of claim 3 further comprising:
   a conductive trace coupled to said first and second outriggers and adapted to be coupled to a slider mounted to the tab section of said flexure.

7. A head suspension assembly comprising:
   a flexure including
      a flexure body;
      first and second outriggers separated from each other and coupled to said flexure body, each including:
         a first section extending in a generally distal direction from said flexure body; and
         a second section coupled to said first section and extending in a proximal direction toward said flexure body; and
      a slider coupled via a tab section to proximal portions of the second sections of said first and second outriggers so that lifting the flexure body causes a lifting force focused at a leading portion of said tab section.

8. The head suspension assembly of claim 7 wherein said flexure further includes
   a proximal section coupled to a proximal end of the second sections of said first and second outriggers.

9. The head suspension assembly of claim 8 wherein the tab section is coupled to said proximal section.

10. The head suspension assembly of claim 9 wherein said tab section is directly coupled to said slider device and said slider device includes a sub-ambient pressure region.

11. The head suspension assembly of claim 9 wherein said flexure further includes
   a neck section coupled between said tab section and said proximal section.

12. The head suspension assembly of claim 9 wherein said flexure further includes
   a conductive trace coupled to said first and second outriggers and coupled to said slider mounted to the tab section of said flexure.

13. A disk drive comprising
   a disk adapted to be rotated; and
   a flexure including
      a flexure body;
      first and second outriggers separated from each other and coupled to said flexure body, each including:
         a first section extending in a generally distal direction from said flexure body; and
         a second section coupled to said first section and extending in a proximal direction toward said flexure body; and
      a slider coupled via a tab section to proximal portions of the second sections of said first and second outriggers so that lifting the flexure body causes a lifting force focused at a leading portion of said tab section, and said slider is adapted to fly above said rotating disk.

14. The disk drive of claim 13 wherein said flexure further includes
   a proximal section coupled to a proximal end of the second sections of said first and second outriggers.

15. The disk drive of claim 14 wherein the tab section is coupled to said proximal section.

16. The disk drive of claim 15 wherein said tab section is directly coupled to said slider device and said slider device includes a sub-ambient pressure region.

17. The disk drive of claim 16 further comprising:
   a disk
   a load beam coupled to said flexure and having a distal end; and
   a ramp, where a distal end of said load beam is adapted slide up said ramp lifting said slider away from said disk.

18. The disk drive of claim 15 wherein said flexure further includes a neck section coupled between said tab section and said proximal section.

19. The disk drive of claim 15 wherein said flexure further includes
  a conductive trace coupled to said first and second outriggers and coupled to said slider mounted to the tab section of said flexure.

* * * * *